(12) United States Patent (10) Patent No.: US 7,165,528 B2
Ward (45) Date of Patent: Jan. 23, 2007

(54) TWO-VALVE HIGH SQUISH FLOW I.C. ENGINE

(76) Inventor: Michael A. V. Ward, 32 Prentiss Rd., Arlington, MA (US) 02476

( * ) Notice: Subject to any disclaimer, the term of this patent is extended or adjusted under 35 U.S.C. 154(b) by 0 days.

(21) Appl. No.: 10/511,517

(22) PCT Filed: Apr. 19, 2003

(86) PCT No.: PCT/US03/12058

§ 371 (c)(1), (2), (4) Date: Jun. 8, 2005

(87) PCT Pub. No.: WO03/089785

PCT Pub. Date: Oct. 30, 2003

(65) Prior Publication Data

US 2005/0241612 A1    Nov. 3, 2005

Related U.S. Application Data

(60) Provisional application No. 60/450,217, filed on Feb. 25, 2003, provisional application No. 60/432,161, filed on Dec. 10, 2002, provisional application No. 60/374,019, filed on Apr. 19, 2002.

(51) Int. Cl.
*F02B 31/00* (2006.01)
*F02P 15/02* (2006.01)
*F02M 67/00* (2006.01)

(52) U.S. Cl. .................... 123/301; 123/310; 123/48 B; 123/531

(58) Field of Classification Search ............... 123/48 B, 123/301, 310, 531, 661, 636, 305
See application file for complete search history.

(56) References Cited

U.S. PATENT DOCUMENTS 5,320,075 A * 6/1994 Regueiro .................... 123/310
6,267,107 B1 * 7/2001 Ward .......................... 123/661
6,748,917 B1 * 6/2004 Hoffmann et al. .......... 123/295

* cited by examiner

*Primary Examiner*—Stephen K. Cronin
*Assistant Examiner*—Hyder Ali
(74) *Attorney, Agent, or Firm*—Burns & Levinson LLP; Jerry Cohen

(57) ABSTRACT

An improved ignition-engine system for internal combustion engines comprising a compact combustion chamber in the cylinder head and two main squish zones (101*a*, 101*b*) for producing high flow and turbulence, and at least one minor squish zone (105) at the end of the intake valve (104), the system using independently operated spark plugs (102*a*, 102*b*), placed asymmetrically at or near the edge of the high flow squish zones to handle both ultra-lean light load conditions and high load conditions without misfire or knocking, the engine leanness and high load operation and further improved by using variable compression ratio and/or direct fuel injection, including air-blast fuel injectors (181) and more centrally located air-blast-ignition fuel injector (193) more ideally suited for four valve engines and mild hybrid engines.

24 Claims, 4 Drawing Sheets

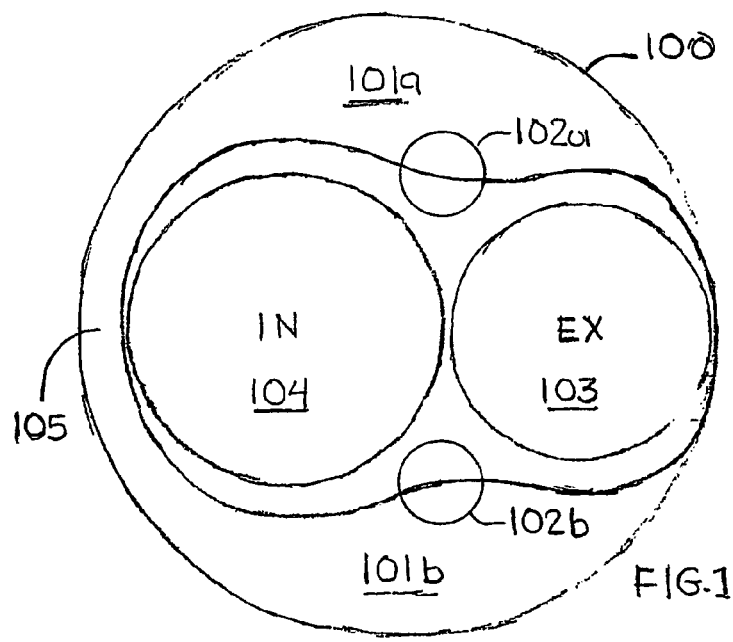
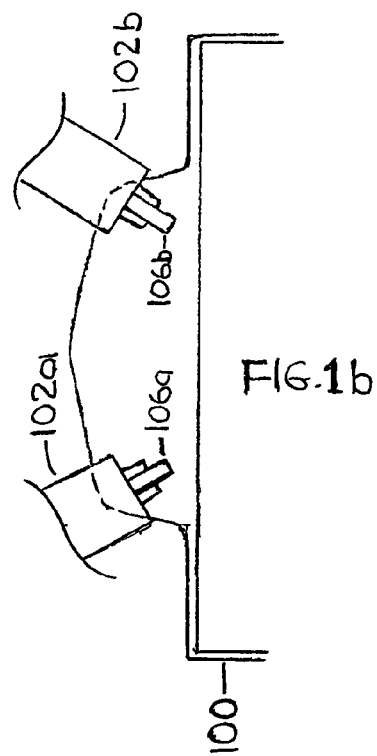
FIG. 1
FIG. 1b
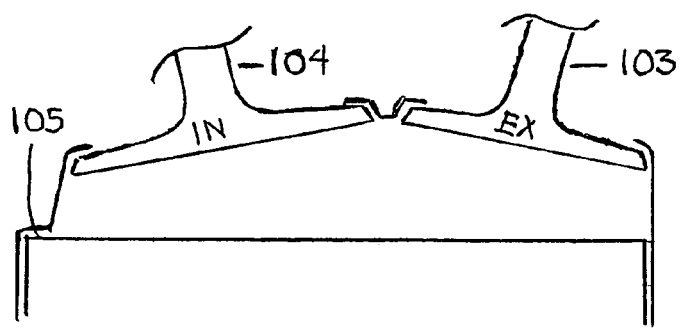
FIG. 1a
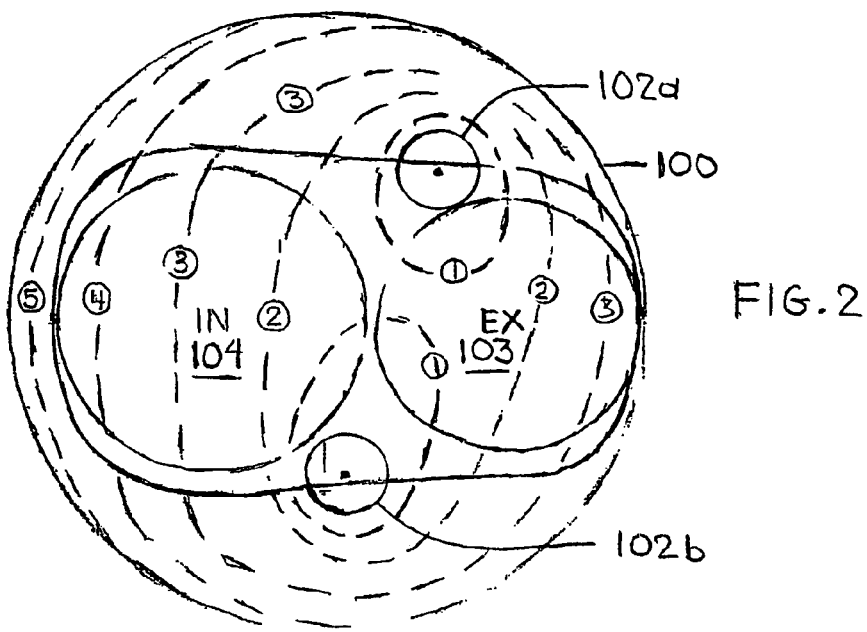
FIG. 2

TWO-VALVE HIGH SQUISH FLOW I.C. ENGINE

This application claims priority under 35 USC 119(e) of provisional application Ser. No. 60/374,019, filed Apr. 19, 2002; Ser. No. 60/432,161, filed Dec. 10, 2002; Ser. No. 60/450,217, filed Feb. 25, 2003.

FIELD OF THE INVENTION

This invention relates to 2-valve piston internal combustion (IC) engines which utilize high squish and enhanced ignition, fuel injection and higher and variable compression ratio to improve their fuel efficiency and exhaust emissions, especially under dilute mixture conditions such as lean burn and high exhaust gas recirculation (EGR).

BACKGROUND OF THE INVENTION AND PRIOR ART

This invention relates, in part, to a 2-valve, 2-spark plug per cylinder engine with squish flow, disclosed in my U.S. Pat. No. 6,267,107 B1, referred to hence forth as '107. The disclosures of the above referenced provisional patent applications, and the '107 and other patents cited below in the disclosure, are incorporated herein as though set out at length herein.

SUMMARY OF INVENTION

This invention relates to improving the design and operation of the squish-flow type, 2-valve dual ignition combustion chamber disclosed in my patent '107, which in this invention includes in one embodiment, removing squish from the far side of the exhaust valve to make room for a larger intake valve for better breathing but only a slight reduction of the two large squish lands and squish flow at the spark plug sites.

The invention also includes improvements of the squish-flow type engine of my patent '107, which includes in one embodiment, a direct injection system, except it is improved by the addition of air in the injector in one case, and in another case it also includes ignition means within the injector, in a novel design, to produce a flame-jet type ignition, to be used alone in a central location, or in conjunction with other spark plugs, or with other such flame-jet injectors, especially applicable to 4-valve engines.

The invention also relates to improvements of the squish-flow type, 2-valve dual ignition combustion chamber disclosed in my patent '107, which includes using a simple type of variable compression ratio piston, which improves engine efficiency by providing higher squish flow at the spark plug sites at lighter load conditions for leaner and faster burn operation, and reduces engine knock and harshness at high loads by means of reduced squish at the plug sites and lower peak cylinder pressures and lower rate of rise of pressure.

OBJECTS OF THE INVENTION

It is an object of the present invention to improve the operation of an engine with high squish flow at the spark plug site (s) by increasing the size of the combustion chamber to increase the size of the intake valve for better breathing.

Another object is to improve the operation of the 2-valve, dual ignition engine, especially under high load conditions, by having the two plugs with different spark gaps and locations relative to the squish flow intensity, so that at high loads only the plug with the smaller gap and/or the poorer squish flow location is fired.

Another object is to improve the fuel control features of the high squish-flow engine by direct fuel injection to make it more suitable for idle stop-start as would be used in a mild hybrid with integrator starter-generator.

Another object to improve lean operation by the use of a central flame-jet producing system based on a three-way integrated air injection, fuel injection, and ignition of the high energy flow-coupling type to tolerate the high injected fuel-air mixture without spark break-up.

Another object is to improve the leanness capability and efficiency of the engine by using variable compression ratio means to operate the engine at a high compression ratio at light loads and at a low compression ratio at high loads.

Other objects of the invention will be apparent from the following detailed drawings of preferred embodiments of the invention taken in conjunction with the accompanying drawings.

BRIEF DESCRIPTION OF THE DRAWINGS

FIGS. 1, 1a, 1b are approximately to-scale, partial top-view and two side-views of preferred embodiments of an engine combustion chamber with dual squish flow lands, dual ignition, and the exhaust valve against the end of the cylinder to maximize the size of the intake valve for engine breathing and to provide it with some squish.

FIG. 2 is a variant of the combustion chamber of FIG. 1 with asymmetrically located spark plugs to improve the knock rating of the engine.

FIG. 6a represents the engine under low power conditions at top center (TC), and FIG. 6b represents the engine at TC under high power conditions, with respectively high and low squish flow.

DISCLOSURE OF PREFERRED EMBODIMENTS

Figure 3A:
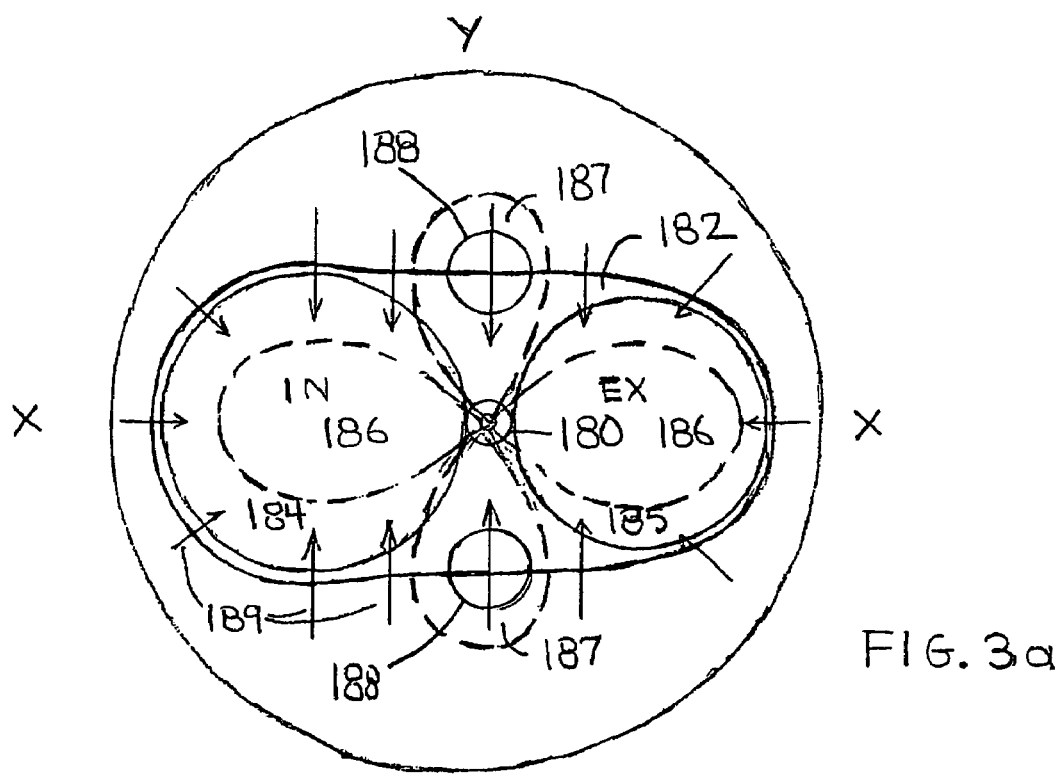
FIGS. 3a to 3c are approximately to-scale partial top and side view drawings of preferred embodiments of the engine combustion chamber for use with in-cylinder direct injection.

FIGS. 1, 1a, 1b are approximately to-scale, partial top-view and two side-views of preferred embodiments of a 2-valve engine combustion chamber with dual squish flow lands 101a, 101b, two spark plugs 102a, 102b (dual ignition), with the exhaust valve 103 located against the end of the cylinder 100 to maximize the size of the intake valve 104 for engine breathing and provide it with some squish from the minor squish land 105. This combustion chamber is an improvement of that of FIGS. 11 to 11b of my patent '107.

As in my patent '107, the combustion chamber is essentially entirely in the cylinder head with an essentially bathtub cross-sectional shape with the two spark plugs located at the edges of the squish lands 101a, 101b, in a line approximately at right angles to the line joining the centers of the two valves 103, 104, to produce high air-flows at the sparkplug sites at the time of ignition for ignition timings near piston top center (TC). The sparks at the spark plug tips 106a, 106b can be formed at the ground J electrodes of standard spark plugs (not shown), or to the piston, disclosed in my patent '107. Preferably, this engine can be operated at compression ratios in the range of 10:1 to 13:1.

FIG. 2 is a variant of the combustion chamber of FIG. 1 with asymmetrically located spark plugs to improve the knock rating of the engine so that the engine can be operated with a compression ratio closer to 13:1 than 10:1. At wide open throttle (WOT) where the mixture is preferably 15:1 for gasoline (stoichiometry), the burn may be too fast and cause engine harshness or knocking. By firing one spark plug instead of two, the harshness may be reduced, especially if the spark plug closer to the exhaust plug is fired, so that the last part of the burn occurs at the far side of the intake valve at the minor squish land 105, which cools the end gas. The dashed curve contours shown in the figure indicate flame front positions as a function of time, progressing with the numerals 1 to 5 (drawn in circles). The preferred compression ratio is between 11:1 and 13:1. The engine can be operated homogenous charge or direct injection.

In the case of FIGS. 1 and 2, the coils used with the spark plugs 102a, 102b can be separate coils for more flexibility of ignition firing and timing (one plug fired, or second plug fired later), or dual output coils for simultaneous firing and lower cost. For dual output coils, the coil stored energy may be higher than 200 mJ to make available a minimum of over 100 mJ to each plug, more easily achievable in a compact design using biasing magnets (which can reduce the requirements for the core area by approximately 40%). In addition, with respect to FIG. 2 which may result in differing levels of squish flow at the two spark gaps of the plugs 102a, 102b, different size of spark gaps can be used to accommodate the different flow levels and cylinder pressures to prevent blow-out or non-sparking of the spark at very high flows or pressures, e.g. high speed, high load conditions with minimum ignition timing advance where squish and pressure is maximum.

Figure 3B:
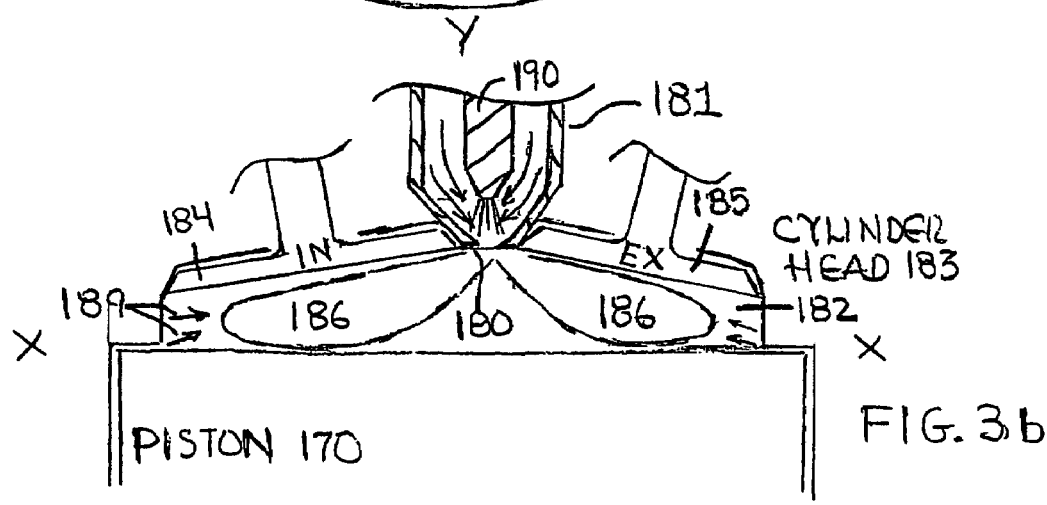
Figure 3C:
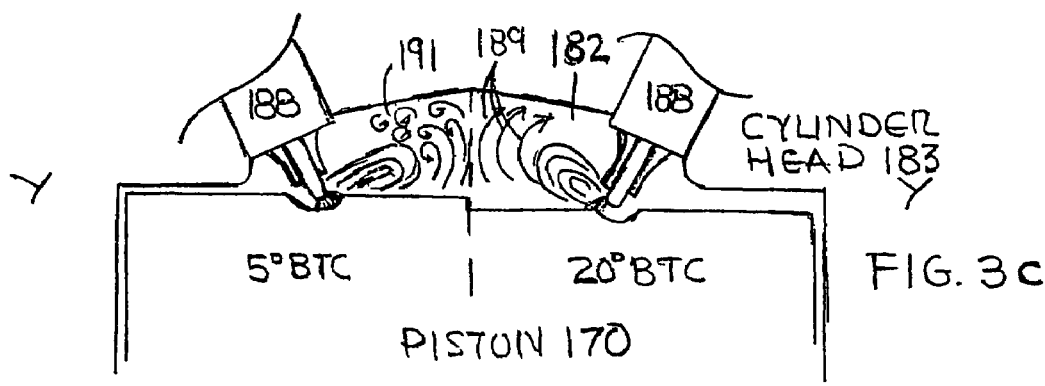

FIGS. 3a to 3c depict approximately to-scale partial views of a variant of the engine and ignition design of FIGS. 11c, 11d of my patent '107. The main advantages of this design, shown using an air-blast type central fuel injector, is that it provides the control features of direct fuel injection, which are particularly advantageous in two stroke engines, in stop-start idle operation of an engine (as in a mild hybrid), and in lean burn and multi-fuel engines. This design is improved by the squish flow type combustion chamber shown, which produces radial flows that 1) scrape any fuel from the flat piston surface, and 2) collide with the air-blast fuel injector flows and prevent them from hitting the cylinder wall surfaces to produce excessive hydrocarbon (HC) emissions (except at full engine load when early injection is required to provide preferably stoichiometric air-fuel operation).

FIG. 3a is a top view showing the central fuel injector end 180 of injector 181, with combustion chamber 182 defined to be mostly in the cylinder head 183, over the intake valve 184 (IN) and the exhaust valve 185 (EX). FIGS. 3b and 3c are two side views along directions X—X and Y—Y, shown in FIG. 3a. In this preferred embodiment, the central air-blast fuel injector 181 blasts pressurized air along with the fuel to improve atomization and to produce desirable intense turbulence in the central region of the combustion chamber. It does this in a circularly symmetric pattern, or other pattern, or as shown in the form of four plumes, two major air-fuel plumes 186 below the intake and exhaust valves, and two minor plumes 187 at the two sites of the spark plugs 188. The air-blast fuel injector is comprised of a central fuel injector 190 around which pressurized air can flow and mix with the fuel.

FIG. 3b gives a side view of the end of the injector 181 and the major two plumes 186, below the intake and exhaust valves 184, 185. FIG. 3c depicts the two spark plugs 188 firing to the piston, which have indentations in the surface to minimize the spark gap change within the preferred practical spark firing timing of 5° to 30° before top center (BTC). The left hand side shows the piston position (and spark gap) at 5° BTC, and the right hand side the piston at 20° BTC. A method of firing to the piston, using what is termed a firing envelope, is disclosed in my U.S. Pat. No. 4,774,914, which is improved by the piston indentations to limit the spark breakdown voltage. Near top center, spark firing occurs within the indentation or cup, and at more advanced positions it fires to the edge of the cup, shown here preferably at the inside edge. Generally, at light loads, the spark may be advanced to 30°, and at full load it will be retarded to, say 5°, which keeps the spark breakdown voltage to, say, between 10 kV and 33 kV, depending on ignition timing and engine load. The fast burn nature of this design, and that to be disclosed with reference to FIGS. 4 and 5, allow for ultra-lean burn with no more than 30° timing advance.

Independent of piston firing, which is not necessary as disclosed in my patent '107, FIG. 3c shows the intense turbulence (vortices 191) produced by the squish colliding flows with flow vectors 189, which now also interact with the central air-fuel blast for further turbulence generation, to speed up the burn under ultra-lean conditions of air-fuel ratios of 30 to 1 (equivalence ratio of 0.5).

Figure 4:
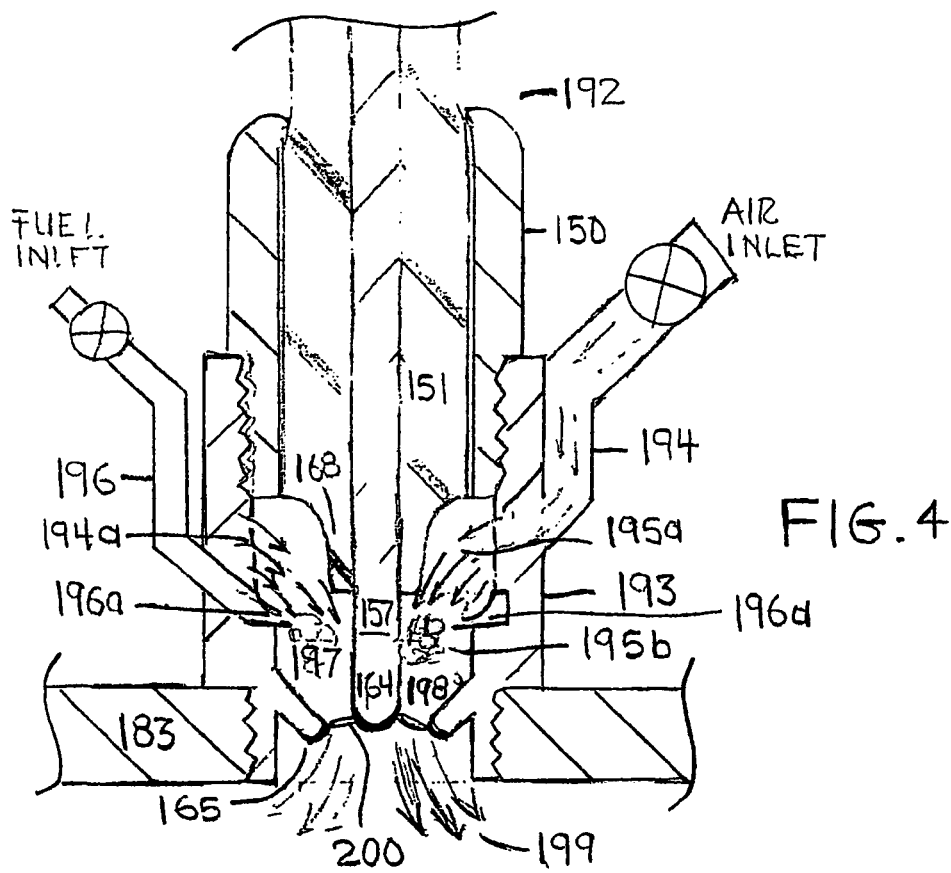
FIG. 4 is an approximately to-scale, partial side-view drawing of the end section of a new form of air-fuel-spark coupling means contained within a single injector body which can be used more advantageously with a four valve engine.

FIG. 4 depicts an approximately to-scale, partial side-view drawing of the end section of a new form of air-fuel-spark coupling means contained within a single injector type unit comprising a multi-function-air-fuel-spark-flow-injection-coupler, or multi-function injector spark coupler "MISC", for short, used to produce a flame-jet plume with intense turbulence, used for ignition and rapidly burning ultra-lean mixtures, as described by Oppenheim and Wolanski in SAE paper 1999-01-0324, and in other references. Like numerals represent like parts with respect to the earlier figures.

A special feature of this MISC system is that it is entirely concentric, made up of a spark plug 192 located at the top end of the injector body 193 with its tips 164/165 at the orifice 198 at the far end, with air-blast inlet means 194 ending at the top end 195*a* of the injector cavity forming a circular inlet means 194*a*, fuel inlet means 196 ending in the middle of the injector cavity forming circular filming surface 196*a* which injects atomized fuel into the lower portion 195*b* of the injector cavity, with the air-blast flow above the filming surface drawing, shearing and mixing with the fuel downwards to produce an air-fuel mixture 197 which is ejected through the orifice 198 as an air-fuel mixture stream 199. As shown, the spark gap 164/165 is made at the tip of the orifice 198 to produce radial spark 200 on which the mixture impinges to form an air-fuel-spark-coupled system which produces an intense flame-jet blast upon ignition, flow resistant sparks of the type disclosed herein, and in my U.S. Pat. No. 6,142,130, referred to henceforth as '130, and my patent '107, with peak spark current over 200 ma, and preferably about 500 ma, are used to provide a high energy, flow-resistant spark which can tolerate a flow velocity of 20 meters/sec without spark break-up.

A key feature of this MISC unit is that since the three components of the system are layered, with the air on top, the fuel in the middle, and the spark at the bottom, there is minimum chance of cavity fouling or spark plug insulator fouling. The air flowing past the insulator end 168 helps keep it clean, and pushes any residual fuel below and outwards, away from the insulator. It may also be advantageous to use a spark plug with a concave insulator end as disclosed in my co-pending patent application of same filing date as this application, referring to provisional patent application Ser. No. 60/450,217. The filming surface, which locates the fuel on a thin circular edge at approximately right angles to the air-flow, insures good atomization and minimum chance of sooting or carbon deposits.

In operation, as the piston moves under compression, air and then fuel is introduced by opening their respective inlet valve means, at a crank angle injection timing depending on the speed and load of the engine, with ignition provided at a crank angle timing for best combustion, as required, while preferably air-fuel mixture is flowing past the orifice and spark gap. For maximum load, one can dispense with the direct injection and introduce the fuel-air mixture in the intake system to produce a homogenous, stoichiometric or slightly rich mixture to be able to make maximum use of the air entering the cylinder. This would require a separate external fuel introduction means. Use of a more powerful and/or larger MCU would facilitate the required controls to achieve more complex operation, which includes sequential turn-on and control of the pressurized air, the fuel, and the spark to achieve the desired level of a turbulent flame jet.

Figure 4A:
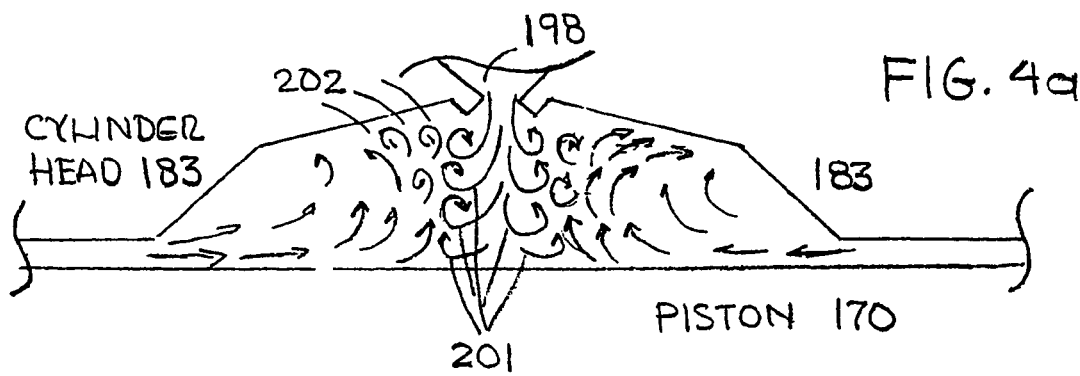
FIG. 4a is a side-view cross-section of the combustion chamber using the air-fuel-spark coupling device of FIG. 4 depicting the turbulence generated by the device and by the squish induced flows produced by the piston near its top center position.

FIG. 4*a* shows a side-view cross-section of the combustion chamber depicting the central MISC system generated turbulence 201, and the squish-flow induced colliding flow turbulence 202, which also interacts with turbulence 201 to produce an intense mixing and homogenization in the central region of the combustion chamber, which also increases the effective residence time of the combustible mixture for faster and cleaner burning of extremely lean mixtures, to minimize or eliminate NOx emissions with minimum HC. Like numerals represent like parts with respect to the prior figures.

The MISC unit can be used alone as a central fuel introduction and ignition means, or it can be used with one or more spark plugs, or in a format with more than one MISC unit. For example two MICs units can be located where the spark plugs 188 would be located as per FIGS. 3*a* and 3*c*, producing their plumes in a 180° pattern, radially inwards which would collide with each other. The radial squish flows at each MISC site would also insure that any excess mixture would be forced radially inwards towards the center of the combustion chamber. In engines without conventional overhead valves, e.g. two-stroke engines, the combustion chamber located in the head can be more circular than elliptical to produce more uniform, intense radial squish flows as the piston approaches the cylinder head. Alternatively, rotary or other types of valves can be used in a more conventional four-stroke engine for greater flexibility in forming the combustion chamber.

Figure 5:
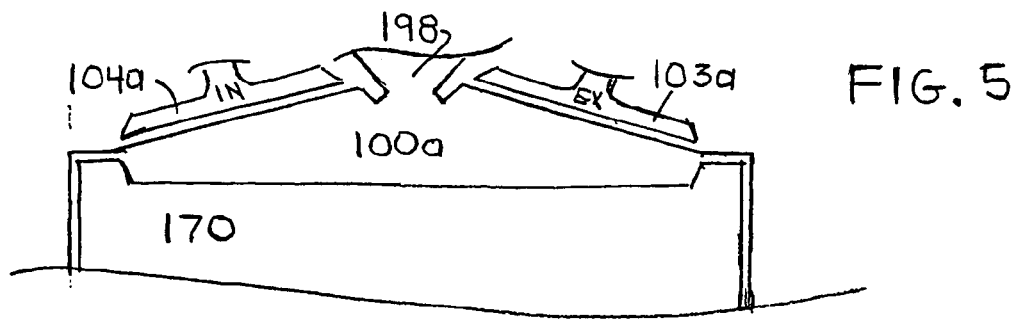
FIG. 5 is an approximately to-scale partial side view of a 4-valve engine with the air-fuel-spark firing injector of FIG. 4 located at the apex of the cylinder head.

FIG. 5 is an approximately to-scale partial side view of a 4-valve engine with the air-fuel-spark firing injector of FIG. 4 located at the apex of the cylinder head. This is of particular advantage since it allows for simplicity of design and manufacture of the cylinder head, especially where direct injection is preferred, and no additional hole is required for the spark plug. Intake valve 104*a* is one of two intake valves, and exhaust valve 103*a* is one of two exhaust valves. Like numerals represent like parts with reference to the previous figures.

Figures 6A, 6B:
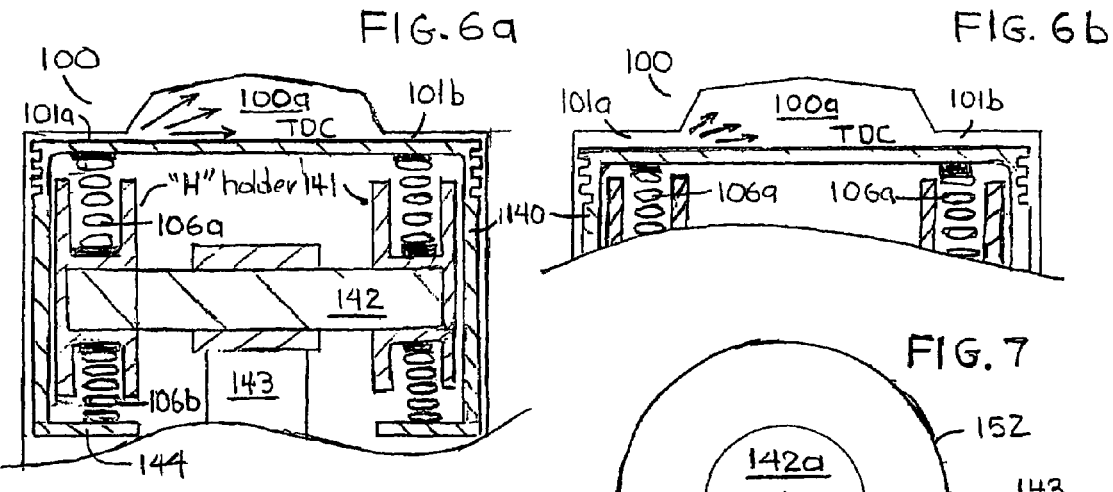
FIGS. 6a and 6b are approximately to-scale, side-view drawings of the combustion chamber of a preferred engine with variable squish-flow and compression ratio, achievable by a spring loaded piston using two large annular springs held in a cylindrical "H" holder held in turn by the wrist pin and located inside the outer edge of the piston, to achieve the variation in squish flow from the variation in compression ratio.

FIGS. 6*a*, 6*b* are approximately to-scale, partial side-view drawings of the combustion chamber 100*a* of a single cylinder 100 of a preferred engine with variable squish-flow and compression ratio, achievable by a spring-loaded piston 140 using two large annular springs 106*a* and is located inside the outer edge of the piston 140, to provide small movement of the piston independent of the wrist pin 142 and connecting rod 143, to achieve a variation in squish flow from the variation in compression ratio. FIG. 6*a* represents the engine under low power conditions at top center (TC), and FIG. 6*b* represents the engine at TC under high power conditions, with respectively high and low squish flow.

Figure 8B:
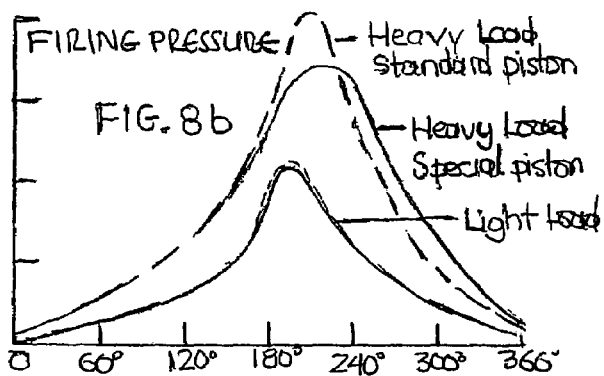
FIG. 8b is a graph of engine firing pressure as a function of crank angle, for a variable compression ratio engine, showing a typical light load pressure curve and the difference in high load pressure curve due to an expanded function of the variable compression ratio piston.
Figure 8A:
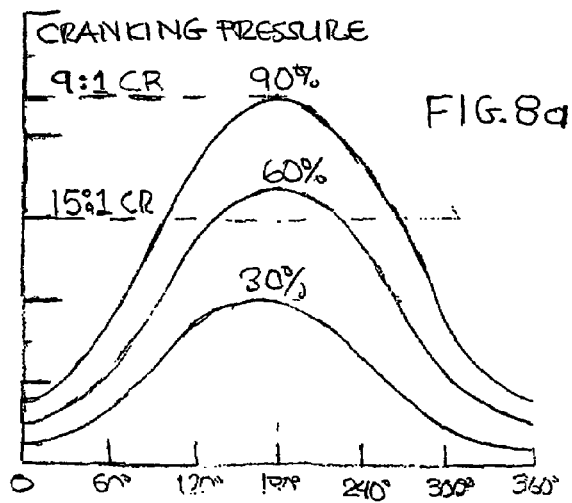
FIG. 8a is a graph of engine cranking pressure as a function of crank angle with engine volumetric efficiency as a parameter, for a variable compression ratio engine, showing typical compression ratios as a function of volumetric efficiency.

FIG. 8*a* is a graph of engine cranking pressure as a function of crank angle with engine volumetric efficiency as a parameter (shown as 30%, 60% and 90%), for the variable compression ratio engine of FIGS. 6*a* and 6*b*, showing typical compression ratio (CR) as a function of volumetric efficiency. FIG. 8*b* is a graph of engine firing pressure as a function of crank angle for the variable compression ratio engine, showing a typical light load pressure curve, and the difference in high load pressure curve due to an expanded function of the variable compression ratio piston.

With reference to FIG. 6*a*, in one mode of operation, in the neutral position, the top spring 106*a* in under compression, and the bottom spring is under tension against the bottom piston stop 144. When under initial compression, the net force of the two springs is relatively small, so that at cranking pressure corresponding to some defined load (volumetric efficiency as indicated in FIG. 8*a*), say 50%, the piston starts to move down relative to the wrist pin, to start to reduce the effective compression ratio from, say, an initial 15:1 to 9:1. Preferably, at a pressure corresponding to full load (e.g. 90% volumetric efficiency), the bottom spring has moved to reduce the compression ratio to its minimum of, say, 9:1, such that the spring is no longer under tension. Further relative movement of the piston requires compression of both springs (bottom spring is now under compression), which provides a stiffer overall spring constant, with the result to limit the peak pressure under heavy load, and not under light load, as indicated in FIG. 8*b*. That is, the dashed curve is for a standard piston, and the solid curve for the variable compression piston.

Figure 7:
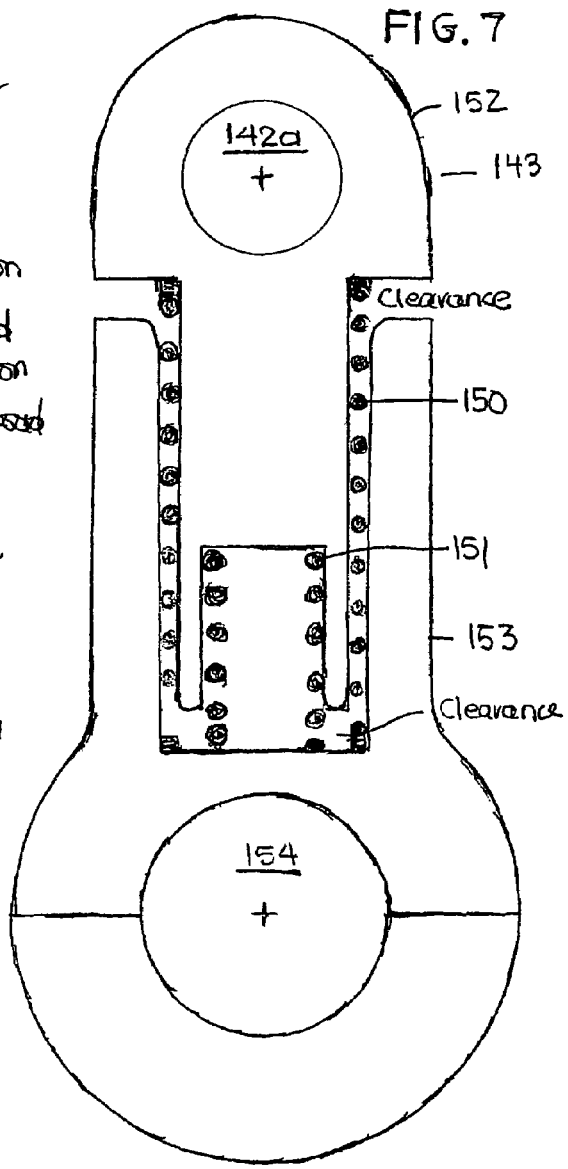
FIG. 7 is an engine piston connecting rod with major and minor springs to achieve a variable compression ratio used exclusively to achieve a variable compression ratio, or used in conjunction with the piston of FIGS. 6a and 6b to achieve further improved features, including limiting of peak cylinder pressures.

There are many ways to achieve variable compression ratio, another example of it being FIG. 7, which comprises a not-to-scale side view of an engine piston connecting rod with major 150 and minor 151 springs which allow the top part 152 with the wrist pin hole 142*a* to move relative the bottom part 153 containing the crank hole 154, to achieve a variable compression ratio of a piston. This unit can also be used with the variable compression ratio piston of FIGS. *a* and 6*b* for further flexibility, for example, by having stiffer springs to limit the high peak pressure under heavy load, as per FIG. 8*b*.

While this variable compression ratio engine can work with one spark plug, preferably it is to be used with the two-spark plug design of my patent '107 where the combustion chamber 100*a* is essentially entirely in the cylinder head, as shown, with the two spark plugs (not shown) located at the edges of the squish lands 101*a*, 101*b*.

In terms of the engine design, the disclosed variable compression ratio (CR) not only has the usual advantages of permitting higher CR at light loads for greater efficiency, but in the case of the two-spark plug squish flow-coupled ignition system, it allows for much higher air-fuel ratio (leaner burn) at the higher compression ratios due to the higher degree of squish flow a the spark plug firing end site, e.g. 36 to 1 AFR at 14 to 1 CR, versus 30 to 1 AFR at 11 to 1 CR, for even greater engine efficiency and lower emissions. It also limits the peak pressure that the spark plugs experiences at firing for less voltage stress on the spark plug and coil, and permits a more useful larger spark gap to be used. It also limits the engine peak pressures for overall lower stress while minimizing the chances of engine knock and allowing for lower octane fuel to be used.

As a complete system, there are other advantages that this ignition-engine system provides, especially in the form of more optimized combinations of the various features and components disclosed herein, including features and components disclosed elsewhere. Among the most important, as a complete engine system, in the form of the disclosed dual ignition Lean Burn Engine (with also high EGR capability), the system makes practical what we refer to herein as the "Lean Hybrid", which is the combination of this more optimized Lean Burn Engine married with a 42 volt based Mild Hybrid (which the ignition prefers) with its integrated starter-generator, to make for by far the most advanced and efficient future engine system, at a fraction of the cost all other future systems under consideration, especially the current very expensive and highly complex Full Hybrid.

In practice, the engine combustion system will be designed with any of the above combinations mentioned, or other combinations, to provide a system that can ignite and rapidly burn extremely lean and/or very high EGR mixtures for producing low NOx and low HC emissions at part load, and acceptably low NOx at high engine load, by either running rich with a catalyst, very lean with a turbocharger, or in combination, or in other ways known to those versed in the art.

Since certain changes may be made in the above apparatus and method, without departing from the scope of the invention herein disclosed, it is intended that all matter contained in the above description, or shown in the accompanying drawings, shall be interpreted in an illustrative and not limiting sense.

What is claimed is:

1. An internal combustion (IC) engine for igniting, combusting, and expanding a burnt air-fuel mixture and producing work by means of a movable piston within a cylinder that has a cylinder head with intake and exhaust valve openings with the combustion chamber located mainly in the head, and further including squish lands for producing high squish-flow and turbulence as the piston nears top center (TC) at the engine compression stroke, the system constructed and arranged to have two or more spark plugs positioned and oriented such that as the piston approaches top center, intense air flow passes through the spark gap to move and spread the spark towards the center of the combustion chamber, the improvement comprising control means for improving the lean burn capability of the engine under light load conditions and the knock rating under high loads wherein the said at least two spark plugs have flexibility relative to each other in terms of ignition firing the said and timing such that the two spark plugs at or near the edge of a high squish region are controlled such that at light loads both plugs are fired, and at selected high load condition the plugs are fired independently, including situations wherein only one plug is fired at a high load where the burn may be too fast with two plugs and cause engine harshness or knocking, so that by firing one spark plug instead of two the harshness may be reduced.

2. An IC engine system as defined in claim 1 including two spark plugs located at or near high squish regions in the combustion chamber which is of a bathtub shape with large squish lands on the two sides of the length section of the bathtub, and a small squish zone at the far end of the bathtub containing the intake valve opening, and a smaller or no squish zone at the far end of the bathtub containing the exhaust valve opening.

3. An IC engine system as defined in claim 2 wherein one spark plug is located in a more central part of the squish edge at a high squish point and the other at a lower squish point nearer to the exhaust valve opening.

4. An IC engine system as defined in claim 1 wherein two spark plugs are used and wherein the two plugs have different spark gap widths.

5. An IC engine system as defined in claim 4 wherein the plug nearer the exhaust valve opening has the smaller spark gap and is fired by itself at high loads, versus both being tired at light load.

6. An IC engine system as defined in claim 1 wherein the fuel introduction means is essentially centrally located fuel injection means.

7. An IC engine system as defined in claim 1 wherein one or more essentially radially outwards fuel injection sprays collide with squish land induced radially inwards squish flow.

8. An IC engine system as defined in claim 7 wherein at least one of one or more spark plugs are located at the edge of the squish zone with which the fuel injection spray interacts.

9. An internal combustion (IC) engine for igniting, combusting, and expanding a burnt air-fuel mixture and producing work by means of a movable piston within a cylinder that has a cylinder head with the combustion chamber located mainly in the head, and further including squish lands for producing high squish-flow and turbulence as the piston nears top center (TC) at the engine compression stroke, the system constructed and arranged to have one or more spark plugs, each with a spark gap, positioned and oriented such that as the piston approaches top center, intense air flow passes though one or more of the spark gaps to move and spread the spark towards the center of the combustion chamber, the improvement comprising means for improving the lean burn capability of the engine under light load conditions and the knock rating under high loads, by direct fuel injection means including air-blast means surrounding the fuel spray.

10. An IC engine system as defined in claim 9 wherein spark gap ignition means is also contained in the air-blast fuel injection means.

11. An IC engine system as defined in claim 10 wherein the air blast entry in above the fuel entry means which is in turn above the spark gap means, defining a three-part system.

12. An IC engine system as defined in claim 11 wherein said three-part system is essentially circularly symmetric.

13. An IC engine system as defined in claim 10 wherein said three-part system is located in the center of the cylinder head of a four valve engine.

14. An IC engine system as defined in claim 1 wherein variable compression ratio means are provided, with high compression ratio at light loads and lower compression ratio at high loads.

15. An IC engine system as defined in claim 14 wherein variable compression means is achieved by having piston top, at the high compression condition, approach as close as practical to the cylinder head without hitting it, defining a very small squish clearance and very high flow, and having the piston further away at low compression ratio.

16. An IC engine system as defined in claim 15 wherein the high compression ratio is approximately 15 to 1.

17. An IC engine system as defined in claim 14 wherein variable compression ratio is achieved by having an "H" annular groove within the piston held by the wrist-pin with annular springs in the top and bottom groove of the "H" groove.

18. An IC engine system as defined in claim 1 wherein variable compression ratio is provided and such variable compression ratio is achieved by having a two part connecting rod with spring means providing the variable compression ratio.

19. An IC engine system as defined in claim 18 wherein said spring means are two annular springs.

20. Method for igniting, combusting, and expanding a burnt air-fuel mixture in an internal combustion (IC) engine and producing work by means of a movable piston within a cylinder that has a cylinder head with intake and exhaust valve openings with the combustion chamber located mainly in the head and fuel introduction and spark means in or adjacent to the combustion chamber, and further including means for producing high squish-flow and turbulence as the piston nears top center (TC) at the engine compression stroke, the system constructed and arranged to have two or more spark plugs positioned and oriented such that as the piston approaches top center, intense air flow passes through the spark gap to move and spread the spark towards the center of the combustion chamber, the improvement comprising steps for improving the lean burn capability of the engine under light load conditions and the knock rating under high loads by using at least two plugs each and providing the two spark plugs with flexibility relative to each other in terms of ignition firing and timing such that the:

1) two spark plugs at or near the edge of a high squish region are controlled such that at light loads both plugs are fired, and at some high load conditions the plugs are fired independently, including one or more conditions in which only one plug is fired at very high load where the burn may be too fast with two plugs and cause engine harshness or knocking, so that by firing one spark plug instead of two the harshness may be reduce;

2) the spark gap sizes may differ so that spark gaps can be used to accommodate the different flow levels and cylinder pressures to prevent blow-out or non-sparking of the spark at very high flows and pressures.

21. An IC engine system as defined in claim 20 wherein the two spark plugs are in each cylinder and each spark plug has a coil associated with it, wherein the coils and plugs are fired independent of each other and wherein the coils are operated at higher than 12 volts battery voltage, i.e. about 42 volts.

22. An IC engine system as defined in claim 20 wherein said two spark plugs are fired to the piston and have a spark firing timing of 5° to 30° before top center (BTC), so that at light loads the spark may be advanced to approximately 30° and at high load may be retarded at approximately 5° which keeps the spark breakdown voltage between approximately 10 kV and 33 kV, depending on ignition timing and engine load.

23. An IC engine system as defined in claim 20 comprising means for removing squish from the far side of the exhaust valve to make room for a larger intake valve for better breathing but only a slight reduction of the two large squish lands and squish flow at the spark plug sites.

24. The method of claim 20 and further providing two or more spark plugs wherein the spark gap sizes differ and controlling firing selectively so that spark gaps can be used to accommodate the different flow levels and cylinder pressures to prevent blow-out or non-sparking of the spark at very high flows and pressures.

* * * * *